United States Patent
Kwasny et al.

(10) Patent No.: US 6,285,992 B1
(45) Date of Patent: Sep. 4, 2001

(54) NEURAL NETWORK BASED METHODS AND SYSTEMS FOR ANALYZING COMPLEX DATA

(76) Inventors: Stanley C. Kwasny, 5277 Washington Pl., St. Louis, MO (US) 63108; Barry L. Kalman, #4 Pricemont Dr., Olivette, MO (US) 63132; William R. Reinus, 217 Jefferson Rd., Webster Groves, MO (US) 63119

( * ) Notice: Subject to any disclaimer, the term of this patent is extended or adjusted under 35 U.S.C. 154(b) by 0 days.

(21) Appl. No.: 08/977,792

(22) Filed: Nov. 25, 1997

(51) Int. Cl.[7] .................................................... G06N 3/02
(52) U.S. Cl. ................................. 706/20; 706/15; 706/16
(58) Field of Search ......................................... 706/41, 20

(56) References Cited

U.S. PATENT DOCUMENTS

| | | | |
|---|---|---|---|
| 5,515,477 | * | 5/1996 | Sutherland et al. ................... 706/41 |
| 5,598,481 | * | 1/1997 | Nishikawa et al. ................... 382/130 |
| 5,703,965 | * | 12/1997 | Fu et al. ................................ 382/232 |
| 5,717,791 | * | 2/1998 | Labaere et al. ....................... 382/274 |
| 5,799,100 | * | 8/1998 | Clarke et al. ......................... 382/132 |
| 5,870,502 | * | 2/1999 | Bonneau et al. ..................... 382/249 |

OTHER PUBLICATIONS

Mano, M. Morris, "Computer System Architecture", pp. 271, Jan. 1982.*

Kaiser, Gerald, A Friendly Guide to Wavelets, Birkhauser, Jan. 1994.*

* cited by examiner

Primary Examiner—Mark R. Powell
Assistant Examiner—Wilbert Starks
(74) Attorney, Agent, or Firm—Armstrong Teasdale, LLP

(57) ABSTRACT

Fully automated methods and systems for processing complex data sets to identify abnormalities are described. In one embodiment, the system includes wavelet processing, recursive processing to determine prominent features, and then utilizing feed forward neural networks (FFNNs) to classify feature vectors generated in the wavelet and recursive processing. With respect to wavelet processing, multiresolution (five-level) and multidirection (two-dimensional) wavelet analysis with quadratic spline wavelets is performed to transform each image. The wavelets are a first-order derivative of a smoothing function and enhance the edges of image objects. Because two-dimensional wavelet transforms quantize an image in terms of space and spatial frequency and can be ordered linearly, the data is processed recursively to determine prominent features. A neural network approach derived from sequential recursive auto-associative memory is then used to parse the wavelet coefficients and hierarchy data. Since the wavelet coefficients are continuous, linear output instead of sigmoidal output is used. This variation is therefore referred to as linear output sequential recursive auto-associative memory, or LOSRAAM. The objective of training the LOSRAAM network is to have the output exactly match the input. Context units arising from serial evaluation of the wavelet coefficient triplets may be collected as vectors. These vectors are subjected to cluster analysis. This analysis yields a number of identifiable and discrete states. From these states, feature vectors are created. Each element in the feature vector represents the number of times the corresponding state from the above cluster analysis is found. Then, feed forward neural networks (FFNNs) are trained to classify feature vectors.

54 Claims, 5 Drawing Sheets

| CLUSTER | STATE VECTOR # | | POPULATION * | SD VECTOR @ | |
|---|---|---|---|---|---|
| 0 | 0.309 | −0.418 | 42384 | 0.100 | 0.081 |
| 1 | −0.074 | −0.270 | 12661 | 0.090 | 0.081 |
| 2 | −0.531 | −0.045 | 32401 | 0.093 | 0.064 |
| 3 | 0.372 | 0.185 | 55648 | 0.117 | 0.085 |
| 4 | −0.006 | 0.005 | 6409 | 0.087 | 0.051 |
| 5 | −0.022 | 0.248 | 25338 | 0.096 | 0.065 |

\* NUMBER OF WAVELET COEFFICIENTS FALLING WITHIN THE CLUSTER.
\# CENTROID OF CLUSTER EXPRESSED AS A TWO DIMENSIONAL VECTOR.
@ STANDARD DEVIATIONS OF THE CENTROIDS ALONG EACH OF THE UNIT AXES.

NEURAL NETWORK BASED METHODS AND SYSTEMS FOR ANALYZING COMPLEX DATA

FIELD OF THE INVENTION

This invention relates generally to detecting anomalies in complex data and, more particularly, to an artificial neural network based system useful in analyzing hierarchical data such as wavelet processed image data.

BACKGROUND OF THE INVENTION

Neural network based systems are known, however, known systems typically are not capable of analyzing a large collection of complex data. Rather, neural network based systems typically operate on subsets of the complex data. For example, and to detect abnormalities in image data, known neural network systems typically only analyze subsets of an entire data set, which reduces the effectiveness of the analysis.

One particular application in which this limitation of known neural network based systems has a significant adverse consequence is in mammography screening. Particularly, breast cancer is now estimated to strike one in eight adult American women, and many national institutions are promoting large-scale breast cancer screening programs. Even with the above described limitations, computer-aided diagnosis techniques have been applied to mammography screening programs and such techniques may offer substantial benefits in terms of cost reduction and increased effectiveness of the screening process. The use of computers to directly prescreen mammograms may eventually permit a substantial reduction in the number of studies that must be viewed by a radiologist. Of course, to achieve such a reduction, computers must be able to directly interpret digitized images and the process must be fully automated.

With respect to digitized images, mammograms show only an estimated 3% of their actual information content. Improvements in the visibility of mammographic information content will probably improve detection of small tumors. It is unlikely, however, that state-of-the-art screen-film radiography alone can be improved to display more information.

Wavelet transformation, a known image enhancement technique, has been used successfully to enhance the visibility of image information content in mammograms, including both masses and microcalcifications. Wavelet image representations also permit high magnitudes of data compression without loss of important image features.

To interpret the digitized images, several rule-based systems use thresholding, subtraction, or both. These techniques have been hampered by high false-positive detection rates. Artificial neural networks (ANN) are an alternative to traditional rule-based (symbolic) methods for computer-aided detection of mammographic lesions. ANNs learn the significance of image features based upon example training images. In general, ANNs are adept at pattern recognition problems.

As explained above, however, most all known ANN systems perform direct digitized data analysis of mammograms using only small regions of interest (ROI) selected from an entire image. Other ANN systems extract features, either qualitative or quantitative, for network training, or have incorporated ANNs into other computer-aided diagnosis schemes to improve lesion detection.

It would be desirable to provide a fully automated system for detecting anomalies in complex data, including for analyzing entire images to identify lesions. It also would be desirable to provide such a system which does not generate a high false-positive detection rate.

SUMMARY OF THE INVENTION

These and other objects may be attained by fully automated methods and systems for processing images to identify anomalies in which an entire set of hierarchical data (i.e., an ordered data set) is processed so that the entire set can be analyzed by a neural network. Such processing is performed utilizing wavelet processing. Particularly, and in one embodiment, multiresolution (five-level) and multidirection (two-dimensional) wavelet analysis with quadratic spline wavelets is performed to transform the data set. For example, and for image data, the wavelets are a first-order derivative of a smoothing function and enhance the edges of image objects. Because two-dimensional wavelet transformations quantize an image in terms of space and spatial frequency and can be ordered linearly, images can be processed recursively to determine prominent features.

In another aspect, the present invention relates to processing the preprocessed data so that the entire complex data set can be analyzed by a neural network. Particularly, the wavelet coefficients form a hierarchy which is linearized as a sequence of triplets: (coefficient, hierarchical level, position in level) by canonical topological sorting and parsed using a neural network approach based on sequential recursive auto-associative memory (SRAAM). Since the wavelet coefficients are continuous, linear output instead of sigmoidal output is used in the SRAAM. This variation is therefore referred to as linear output sequential recursive auto-associative memory, or LOSRAAM.

At the completion of LOSRAAM training, the coefficients and their context units so derived can be used in the network to predict the preceding wavelet coefficient triplet within a predetermined error tolerance. The activation pattern associated with the context units constitute a vector in state space. The input half of the LOSRAAM neural network maps the coefficient triplets and state space vectors into other state space vectors. The objective of LOSRAAM training is to make this mapping reversible using the output half of the LOSRAAM network. Thus, given any but the first wavelet coefficient information, the network can approximately predict the prior wavelet coefficient, its hierarchical level, its position within the level, and the activation of the context units that will predict the preceding wavelet coefficient triplet. Thus, the entire set of wavelet coefficients theoretically can be predicted from the last pair of hidden (context) units.

The LOSRAAM training process is repeated several times varying the number of context units and other training parameters, and each resultant LOSRAAM network may provide a different interpretation of the internal structure of the data. The set of context unit activation patterns arising from the LOSRAAM hidden layer defines a set of vectors in a state space. These vectors are subjected to cluster analysis.

The cluster analysis yields identifiable and discrete states. From these states, a feature vector is created for each image. Each element in the feature vector represents the number of times the corresponding state from the above cluster analysis is found in each image. The feature vectors are further processed from discrete counts to continuous, fuzzy values by weighting them according to the average fit each state vector achieves with the model state vector for that cluster. Thus, each image may be represented as a fuzzy feature vector (FFV).

Then, several feed forward neural networks (FFNNs) are trained to classify the FFVs. FFNNs differ according to their starting weights, the use of hint units, and other training parameters. Such FFNN training may be performed using the conjugate gradient method modified for use with a selfscaling error function, optimized to reduce the number of derivative computations, and monitored for restart conditions. The FFNN may also contain special (hint) output units whose target values are chosen to constrain training results by introducing coarse positional output information.

The above described system is fully automated for detecting anomalies in complex data, such as for prescreening images. For mammography studies, therefore, the system is capable of analyzing entire images to identify lesions. The system also does not generate a high false-positive detection rate.

DETAILED DESCRIPTION

In one aspect, the present invention relates to fully automated methods and systems for processing images to identify anomalies. As described below in more detail, the system includes wavelet processing, recursive processing to determine prominent features, and feed forward neural network (FFNN) processing to classify feature vectors generated in the wavelet and recursive processing. The present invention, however, is not limited to processing image data, and can be utilized to analyze any collection of data.

In addition, and in another aspect, the present invention relates to the preprocessing of a set of complex data for further analysis. Specifically, difficulties associated with compressing a large set of complex data without loss of resolution has limited the use of neural network based systems. By preprocessing the data as described below, even a very large and complex ordered data set can be analyzed by a neural network based system. In addition, the preprocessed data could be utilized in rule-based systems and probability based systems, for example, and is not limited to use in neural network based systems.

Figure 1:
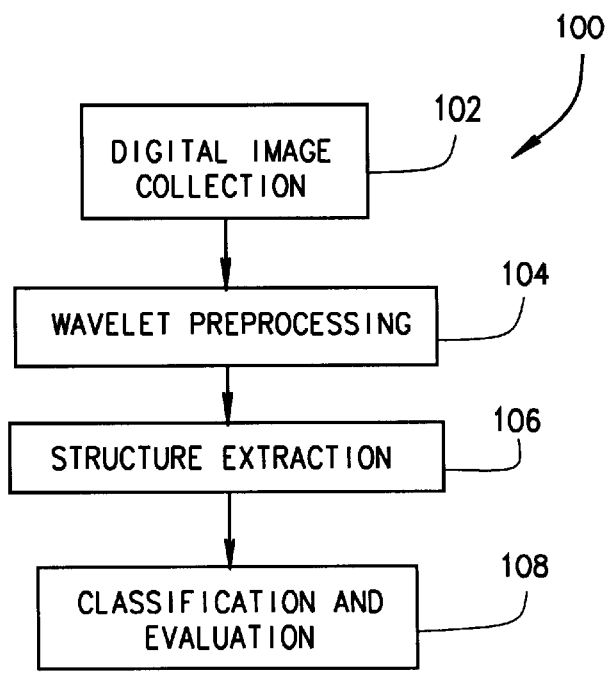
FIG. 1 is a high level flow chart illustrating the process steps for image processing in accordance with one embodiment of the present invention.

FIG. 1 is a high level flow chart 100 illustrating the process steps for image processing in accordance with one embodiment of the present invention. As shown in FIG. 1, digital data is first collected 102. In the exemplary embodiment, the data is image data and can be collected using known digitizing systems. One known digitizing system is commercially available from Eastman Kodak, Rochester, N.Y., and this known system incorporates a 100-um focal spot film digitizer (a model 200 digitizer commercially available from Lumisys, Sunnyvale, Calif.). After digitization, the images may be on the order of 2,400×1,800 pixels×12 bits.

After collection of the digital image data, wavelet preprocessing is performed 104. As described below in more detail, and in connection with wavelet preprocessing, two dimensional wavelet selection and two dimensional wavelet processing (spatial and frequency quantization) are performed. In particular, and in one embodiment, multiresolution (five-level) and multidirectional (two-dimensional) wavelet analysis with quadratic spline wavelets may be utilized to transform each square image. Such wavelet processing is described, for example, in Mallat et al., Characterization Of Signals From Multiscale Images, IEEE Trans Pattern Anal Machine Intell, 1992, 14:710–732, which is incorporated herein, in its entirety, by reference. The wavelets are a first-order derivative of a smoothing function and enhance the edges of image objects.

Subsequent to wavelet preprocessing, structure extraction operations 106 are performed. The structure extraction process generally includes linear output sequential recursive auto-associative memory, or LOSRAAM, training. The output of the LOSRAAM operations is a set of state vectors, and these extracted state vectors are subjected to cluster analysis.

In the cluster analysis, M identifiable and discrete states are determined, and from these states, a M-element feature vector may be created 108. In this example, M=6. The feature vectors are further processed from discrete counts to continuous, fuzzy values by weighting them according to the average fit each state vector achieves with the model state vector for that cluster. Each image is then represented as an M-element fuzzy feature vector (FFV). In the example, representing each image as a six-element fuzzy feature vector (FFV), with each element contained in 4 bytes, gives a final compression ratio which enables analysis of large complex data sets in feed forward neural network (FFNN) training.

Figure 2:
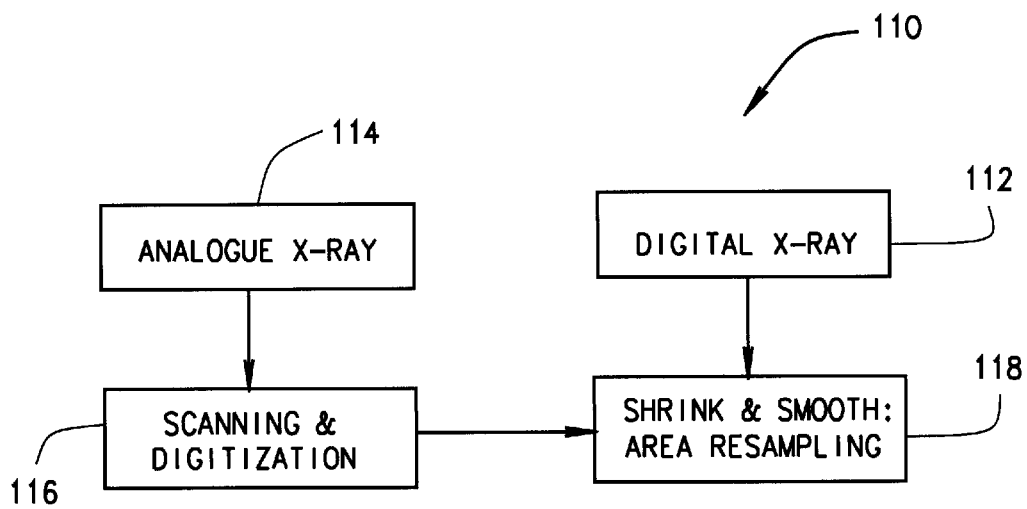
FIG. 2 is a high level flow chart illustrating the process steps for image preparation using area resampling in accordance with one embodiment of the present invention.

To further illustrate the digital image collection process, FIG. 2 is a high level flow chart 110 illustrating the process steps for image preparation using area resampling for mammography. Particularly, in mammography, images can either originate from a digital x-ray machine 112, or from film (i.e., analogue x-ray) 114 which is then digitized 116. Usually, mammograms for screening consist of two analogue x-ray images, and each image is scanned and digitized using, for example, a film digitizer system. One known digitizing system is commercially available from Eastman Kodak, Rochester, N.Y., and this known system incorporates a 100-um focal spot film digitizer (a model 200 digitizer commercially available from Lumisys, Sunnyvale, Calif.). After digitization, the images may be on the order of 2,400×1,800 pixels×12 bits.

Subsequent to scanning (if necessary) and digitizing the image, all further image processing and neural network training may be performed on a computer such as a SPARC Center 2000, commercially available from Sun Microsystems, Sunnyvale, Calif. Such a computer has twenty available processors.

Each image is resized 118 using an area-resampling algorithm. Specifically, the area-resampling algorithm determines the value of each pixel in the new image in proportion to the area from which it is derived in the original image. An example of area-resampling is described in Newman et al., Principles of Interactive Computer Graphics, New York, N.Y., McGraw-Hill, 1979, pages 402–404. As a result of area-resampling, the image is re-sized from a rectangular matrix to a square matrix (e.g., 1,280×1,280 pixels, each 1 byte in depth).

Figure 3:
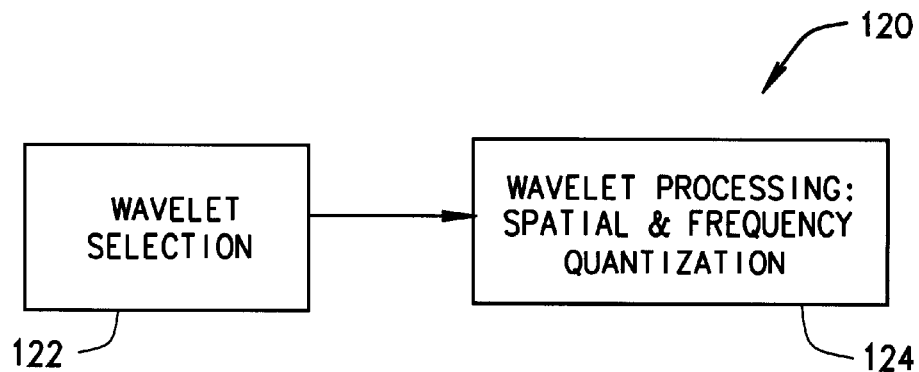
FIG. 3 is a high level flow chart illustrating the process steps for image preparation using wavelets in accordance with one embodiment of the present invention.

FIG. 3 is a high level flow chart 120 illustrating the process steps for image preparation using wavelets. As shown in FIG. 3, two dimensional wavelet selection 122 and two dimensional wavelet processing (spatial and frequency quantization) 124 are performed. In particular, and in one embodiment, multiresolution (five-level) and multidirectional (two-dimensional) wavelet analysis with quadratic spline wavelets may be utilized to transform each square image. Such wavelet processing is described, for example, in Mallat et al., Characterization Of Signals From Multiscale Images, IEEE Trans Pattern Anal Machine Intell, 1992, 14:710–732, which is incorporated herein, in its entirety, by reference. The wavelets are a first-order derivative of a smoothing function and enhance the edges of image objects.

Figure 4:
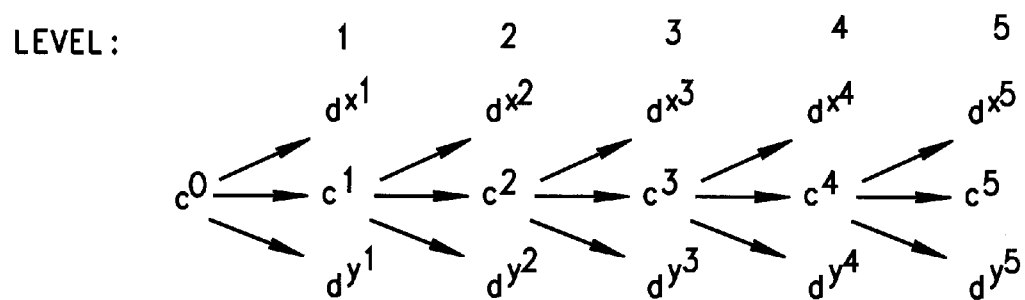
FIG. 4 is a diagram of wavelet hierarchy showing the number of coefficients that may result at each level under one choice of wavelet transformation.

The wavelets transform the data set referenced above to, for example, 1,092,800 4-byte floating point coefficients within the interval (−1,1) and distributed across five levels as shown in FIG. 4. The wavelet coefficients can be viewed hierarchically, as illustrated, descending along the two dimensions (x followed by y) at each of the five levels of resolution, terminating with the remaining (nondecomposed) coefficients at level five. The total number of coefficients and the applicable multiplier is shown at each level.

For high quality mammogram reconstruction, a truncated wavelet hierarchy can be utilized wherein coefficients below a certain threshold are discarded, as described by Laine et al., Wavelet Processing Techniques For Digital Mammography, Conference on Visualization in Biomedical Computing, Chapel Hill, N.C., October, 1992, which is incorporated herein, in its entirety, by reference. In this example, a coefficient threshold of 0.25 provides acceptable results for subsequent processing as described below.

After truncation of the wavelet transform, with use of 0.25 as the coefficient threshold, a data set of 702 images may be represented by 3,386,421 triplets (wavelet coefficient, hierarchy level, position within level) of 4-byte floating point values with an average of 4,824 triplets per image. Thus, after wavelet transformation and truncation, a compression ratio of 75.5:1 is achieved.

Because two-dimensional wavelet transformations quantize an image in terms of space and spatial frequency and can be ordered linearly, images can be processed recursively to determine prominent features. In the present invention, the wavelet coefficients form a hierarchy which is linearized as a sequence of triplets: (coefficient, hierarchical level, position in level) by canonical topological sorting and parsed using a neural network approach based on sequential recursive auto-associative memory (SRAAM). This linearization method is fully described in Kwasny et al., Tail Recursive Distributed Representations and Simple Recurrent Neural Networks, Connection Science, 1995, 7:61,80 which is incorporated herein, in its entirety, by reference. Since the wavelet coefficients are continuous, linear output instead of sigmoidal output is used in the SRAAM, which extends the [+1,−1] bounds of the output values indefinitely. This variation is therefore referred to as linear output sequential recursive auto-associative memory, or LOSRAAM.

Figure 5:
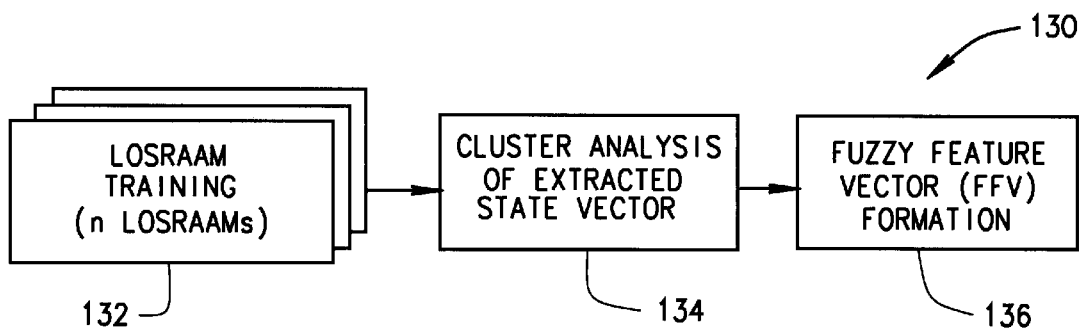
FIG. 5 is a high level flow chart illustrating the process steps for structure extraction using LOSRAAM neural networks and clustering in accordance with one embodiment of the present invention.
Figure 6:
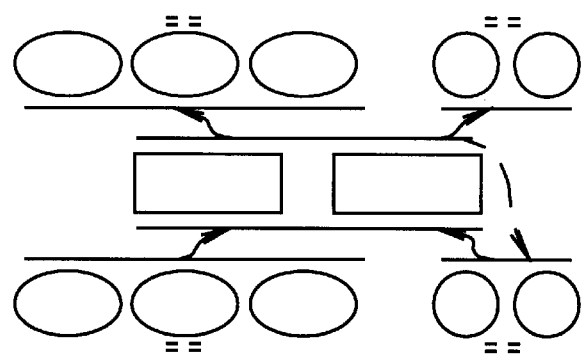
FIG. 6 is an exemplary schematic illustration of a LOSRAAM neural network using two context units.

FIG. 5 is a high level flow chart 130 illustrating the process steps for structure extraction using LOSRAAM neural networks and clustering. An objective of auto-associative training 132 is to have the output exactly match the input. Therefore, the LOSRAAM network is constructed by using an input external layer and a mirror-image output external layer with each fully connected to a hidden layer. Each external layer has three input-output units which correspond to the values in wavelet triplets, and a number of context units, as shown in FIG. 6. In FIG. 6, linear input and output units are represented as ellipses and context input and output units are represented as circles. Between these two external layers is a hidden layer with the same number of hidden units as context units, two in this example. The hidden units are represented as rectangles. The number of hidden and context units chosen for the LOSRAAM architecture may be determined empirically by testing architectures with differing numbers of units. The activation values of the context units in the input layer are set by using the values developed in the hidden units from input of the immediately preceding wavelet coefficient triplet. The values of the initial context units associated with the first wavelet coefficient triplet in the series are set to zero. Each of the three layers is fully connected with adjacent layers in a feed-forward direction as shown in FIG. 6. Training is carried out on the entire data set until a plateau is reached and no better prediction can be obtained. Because this network is used as a classification system for the wavelet coefficients, it is tested only on data used in training the network.

At the completion of LOSRAAM training, the coefficients and their context units so derived can be used in the network to predict each preceding wavelet coefficient triplet within a predetermined error tolerance. The activation pattern associated with the context units constitute a vector in a state space. The input half of the LOSRAAM neural network maps the coefficient triplets and state space vectors into other state space vectors. The objective of LOSRAAM training is to make this mapping reversible using the output half of the LOSRAAM network. Thus, given any but the first wavelet coefficient information, the network can approximately predict the prior wavelet coefficient, its hierarchical level, its position within the level, and the values of the context units that will predict the preceding wavelet coefficient triplet. Thus, the entire set of wavelet coefficients theoretically can be predicted from the last pair of hidden (context) units. However, the residual network prediction error would be propagated additively by using just this single vector. Consequently, the entire set of context unit activation patterns is captured.

Figures 7, 8:
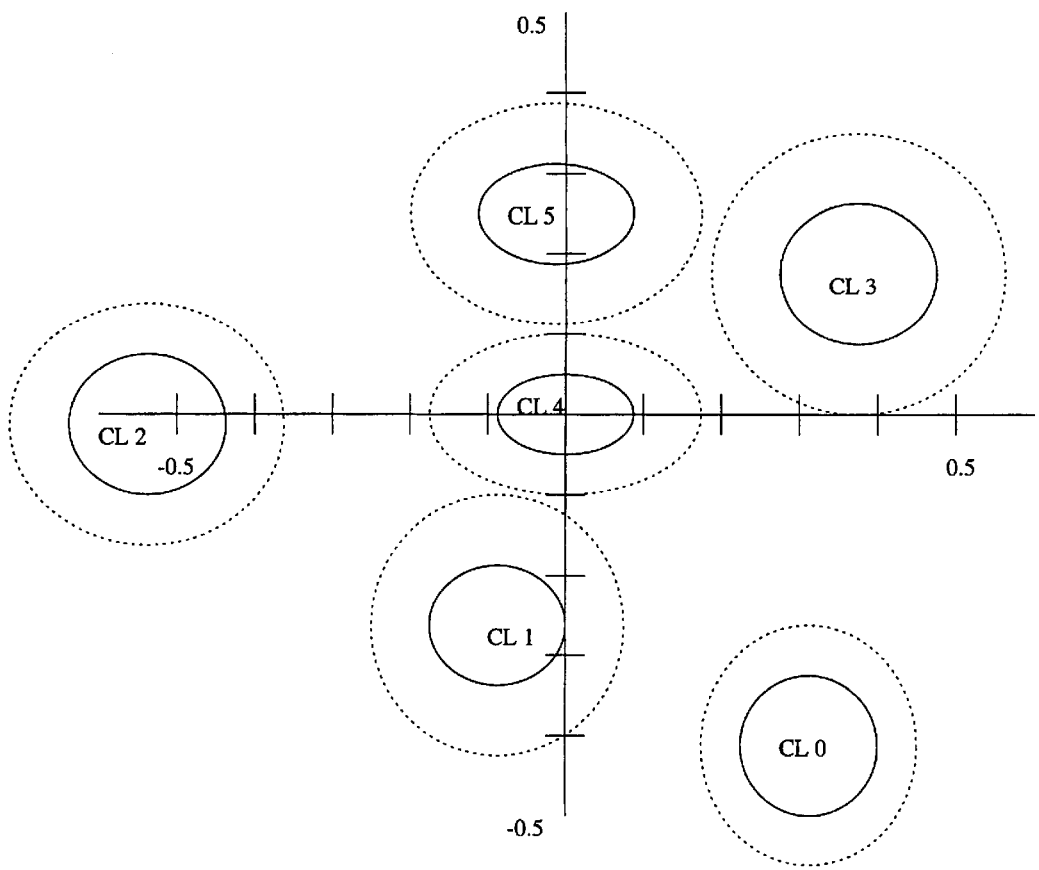
FIG. 7 is a graph illustrating exemplary LOSRAAM clusters for one specific clustering run.
FIG. 8 is a table illustrating the results of the exemplary LOSRAAM clustering of wavelet coefficients shown in FIG. 7.

The set of context unit activation patterns arising from the LOSRAAM hidden layer defines a set of vectors in a state space. These vectors are subjected to cluster analysis 134 using, for example, a method such as described in Fu, Neural Networks in Computer Intelligence, McGraw-Hill, St. Louis, Mo., 1994, which is incorporated herein, in its entirety, by reference, modified to handle data that cluster at any point, including at the origin. This analysis, when applied during a previous, simpler study which used only two hidden units and a sensitivity factor of 0.5, yielded six identifiable and discrete states as shown in FIG. 7 and the accompanying numeric table in FIG. 8.

Referring again to FIG. 5, and from these states, an N-element feature vector may be created 136 for each image. The process described in Dai, Wavelet Applications In Process Sensor Data Analysis, Doctoral Dissertation, Washington University, St. Louis, Mo., 1996, which is incorporated herein, in its entirety, by reference, may be utilized to create the feature vector. Each element in the feature vector represents the number of times the corresponding state from the above cluster analysis is encountered under LOASRAAM processing of each image.

The feature vectors are further processed from discrete counts to continuous, fuzzy values by weighting them according to the average fit each state vector achieves with the model state vector for each cluster. Representing each image as a six-element fuizzy feature vector (FFV), in this example, with each element contained in 4 bytes, gives a final compression ratio for this data set on the order of 218,000:1. This level of compression makes it feasible to use large complex data sets in FFNN training.

The above described process for compressing a data set can be used to reduce a complex data set to practical size for presentation to a FFNN. Therefore, it should be understood that such process is not limited to just mammography analysis, nor just to use with image data. The above described process can be used to compress most any complex data set.

Singular value decomposition (SVD), a well-known mathematical process, may be used to preprocess the FFVs which are the inputs to the FFNNs. SVD transforms the columns of the matrix formed by the set of input vectors into an orthogonal matrix. Training is believed to proceed better with the transformed inputs. SVD assigns a singular value (SV) to each column of the transformed matrix. If the SV is below an arbitrary threshold, 1000 for example, the input unit for this column corresponds to input noise and that unit is removed from the FFNN. This helps in controlling the number of variables in the FFNN and may help in improving the generalization performance of the FFNNs. Because SVD is a well-defined linear transformation, it has a well-defined inverse. This inverse transformation can be used to back transform the weights on the input layer connections yielding a network which accepts inputs in their original orientation.

A process of training LOSRAAM neural networks as well as feed forward neural networks (FFNNs) is described in Kalman et al., High Performance Training Of Feed Forward And Simple Recurrent Networks, Neurocomputing, 1997, 14:63–84, which is incorporated herein, in its entirety, by reference. Such neural network training may be performed using the conjugate gradient method modified for use with a self-scaling error function, optimized to reduce the number of derivative computations, and monitored for restart conditions with a technique described by Powell, Restart Procedures For The Conjugate Gradient Method, Math Programming, 1977, 12:241,254, which is incorporated herein, in its entirety, by reference.

The LOSRAAM training process described above is repeated several times (FIG. 5) varying the number of context units and other training parameters, including but not limited to changing the set of random start weights and training set data. Each resultant LOSRAAM network may provide a different interpretation of the internal structure of the data. Subsequent processing described below occurs for each LOSRAAM network so derived.

The architecture of a FFNN is configured by connecting all units in one layer with those in another layer. This process may result in connections which do not contribute in any significant way to the task. Once a FFNN is trained, these superfluous connections may be identified and removed. This technique is a type of network surgery in which any connection (except threshold connections) which has a value near zero is removed. The network so reduced is then re-trained to yield a network with fewer adjustable parameters. This process may have little affect on the training performance level, but potentially can affect the ability of the network to generalize to unseen cases.

Figure 9:
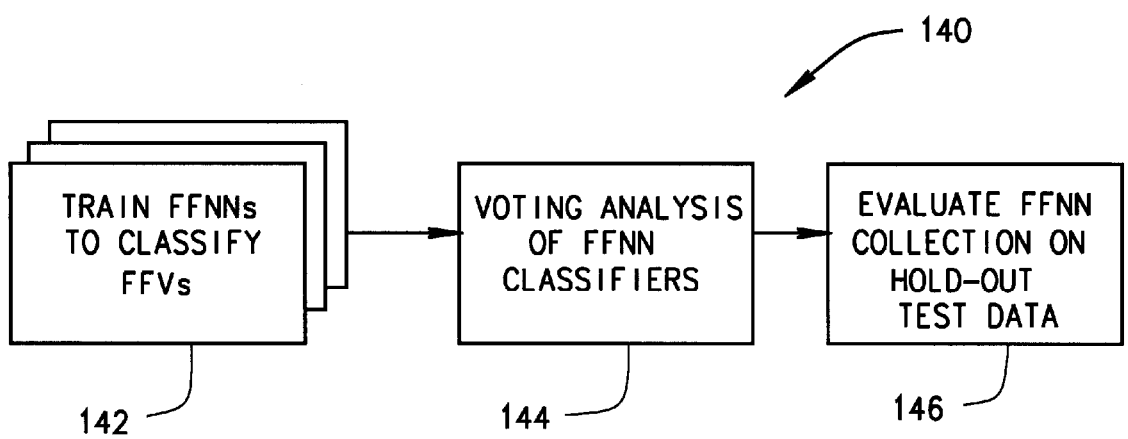
FIG. 9 is a high level flow chart illustrating classification and evaluation in accordance with one embodiment of the present invention.

FIG. 9 is a high level flow chart 140 illustrating classification and evaluation. Particularly, FIG. 9 illustrates classification 142, voting 144, and evaluation 146 steps. Several feed forward neural networks (FFNNs) are trained to classify FFVs. The PFNNs may contain special output units referred to as hint units whose target values are chosen to constrain training results, as described in Yu, Extra Output Biased Learning, Technical Report AI90-128, University of Texas, March, 1990, Austin, Tex., which is incorporated herein, in its entirety, by reference. A hint may represent information about the spatial location of the anomaly, for example.

Each of the multiple LOSRAAM solutions leads to multiple FFNN solutions for their own particular part of the process using different restart conditions and with or without the availability of hints. Each combination of solutions represents a sample classifier from the enormous solution space generated by the nonlinear, multivariable optimization task of classifying images. If it is assumed that these classifiers are at least somewhat independent, they may be combined through voting 144, according to the binomial probability distribution, to produce a single classifier with improved performance. Having the multiple networks vote to predict whether a given mammographic pair of images shows a mass, for example, is much better than relying on the prediction of a single best network.

In this example, each of three LOSRAAM networks generates 4 FFNNs resulting in 12 network classifiers. The number of networks is a realistic tradeoff determined by diminishing returns as the number of networks increases. In practice, the overall system with voting on samples representing non-masses (specificity) is believed to significantly outperform a system that uses a single best network. Performance on samples representing masses (sensitivity) is about the same as with voting as with a single network. A single network may predict 57% of the non-mass images correctly and 67% of the mass images. Using the 12 network classifiers and voting, in this example, 61% of the non-mass cases and 81% of the mass cases may be predicted correctly. Using the single best network may predict only 50% of the non-mass cases and 82% of the mass cases.

The above described system is fully automated for pre-screening images and is capable of analyzing entire images to identify lesions. Such a system also does not generate a high false-positive detection rate.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A system for analyzing digitized x-ray mammography image data to identify abnormalities, said system comprising a processor programmed to perform:

wavelet processing to transform full mammography images, said wavelet processing comprising multiresolution and multidirection wavelet processing with quadratic splines, said wavelets being a first-order derivative of a smoothing function which enhances edges of image objects;

recursive processing to determine prominent features in the mammography images, said recursive processing based on sequential recursive auto-associative memory to parse wavelet coefficients and hierarchy data, wherein context unit sets are generated and wherein wavelet coefficient triplets are collected as N-dimensional vectors; and feed forward neural network processing.

2. A system in accordance with claim 1 wherein said N-dimensional vectors are subjected to cluster processing which yields M>1 discrete states, wherein a M-element feature vector is generated from said cluster processing, each vector element representing a number of times a corresponding state is found in each image.

3. A system in accordance with claim 2 wherein said vector is eighted in accordance with the context unit vectors proximity to the centroid of the clusters.

4. A system in accordance with claim 2 wherein said feed forward neural network processing is performed to classify said feature vectors.

5. A system for compressing an entire complex data set to a size sufficient for presentation to a neural network for the neural network to detect abnormalities in the data set, the complex data set comprising waveform signal data in one or more dimensions that is susceptible to wavelet transformation, said system comprising a processor programmed to perform wavelet processing of the complex data set with quadratic spline wavelets, and recursive processing of the complex data set.

6. A system in accordance with claim 5 wherein the data to be compressed is a set of complex data that can be arranged in a multidimensional array of cells, and said system is configured to compress the data to a size sufficient to permit neural network processing.

7. A system in accordance with claim 5 wherein said wavelet processing comprises multiresolution and mulfidirection wavelet processing.

8. A system in accordance with claim 5 wherein said wavelet processing is performed to transform full images.

9. A system in accordance with claim 5 wherein wavelets used in said wavelet processing are a first-order derivative of a smoothing function which enhance edges of image objects.

10. A system in accordance with claim 5 wherein said recursive processing is performed to determine prominent features.

11. A system in accordance with claim 5 wherein said recursive processing is based on sequential recursive auto-associative memory to parse wavelet coefficients and hierarchy data.

12. A system in accordance with claim 5 wherein said N-dimensional vectors are subjected to cluster processing which yields M>1 discrete states.

13. A system in accordance with claim 12 wherein an M-element feature vector is generated from said cluster processing, each vector element representing a number of times a corresponding state is found in each image.

14. A system in accordance with claim 13 wherein said vector is weighted in accordance with the context unit vectors proximity to the centroid of the clusters.

15. A system in accordance with claim 5 wherein said entire complex data set comprising waveform signal data in one or more dimensions comprises radio signal data.

16. A system for processing a complex data set to identify abnormalities, said system comprising a processor programmed to perform:

wavelet processing of an entire set of waveform signal data in one or more dimensions;

recursive processing of the waveform signal data; and feed forward neural network processing of the waveform signal data.

17. A system in accordance with claim 16 wherein the set of data can be arranged in a multidimensional array of cells and said wavelet processing and said recursive processing compress the data set to a size sufficient to permit neural network processing.

18. A system in accordance with claim 16 wherein said wavelet processing comprises multiresolution and multidirection wavelet processing.

19. A system in accordance with claim 18 wherein said wavelet processing is performed to transform full images.

20. A system in accordance with claim 18 wherein said wavelets are a first-order derivative of a smoothing function and enhance edges of image objects.

21. A system in accordance with claim 16 wherein recursive processing is performed to determine prominent features.

22. A system in accordance with claim 16 wherein recursive processing is based on sequential recursive auto-associative memory to parse wavelet coefficients and hierarchy data.

23. A system in accordance with claim 16 wherein context unit sets are generated in said recursive processing and wherein wavelet coefficient triplets are collected as N-dimensional vectors.

24. A system in accordance with claim 23 wherein said N-dimensional vectors are subjected to cluster processing which yields M>1 discrete states.

25. A system in accordance with claim 24 wherein an M-element feature vector is generated from said cluster processing, each vector element representing a number of times a corresponding state is found in each image.

26. A system in accordance with claim 25 wherein said vector is weighted in accordance with said context unit vectors proximity to a centroid of the clusters.

27. A system in accordance with claim 26 wherein said feed forward neural network processing is performed to classify said feature vectors.

28. A system in accordance with claim 16 wherein said waveform signal data comprises radio signal data.

29. A system for processing image data to identify abnormalities in a image, said system comprising a processor programmed to perform:

wavelet processing comprising multiresolution and multidirection wavelet processing using quadratic splines;

recursive processing to determine prominent features, said recursive processing based on sequential recursive auto-associative memory to parse wavelet coefficients and hierarchy data; and feed forward neural network processing.

30. A system in accordance with claim 29 wherein said wavelet processing is performed to transform fill images.

31. A system in accordance with claim 29 wherein said wavelets are a first-order derivative of a smoothing function and enhance edges of image objects.

32. A system in accordance with claim 29 wherein context unit sets are generated in said recursive processing and wherein wavelet coefficient triplets are collected as N-dimensional vectors.

33. A system in accordance with claim 32 wherein said N-dimensional vectors are subjected to cluster processing which yields M>1 discrete states.

34. A system in accordance with claim 33 wherein a M-element feature vector is generated from said cluster processing, each vector element representing a number of times a corresponding state is found in each image.

35. A system in accordance with claim 34 wherein the vector is weighted in accordance with the context unit vectors' proximity to the centroid of the clusters.

36. A system in accordance with claim 35 wherein said feed forward neural network processing is performed to classify said feature vectors.

37. A method for processing waveform signal data in one or more dimensions to identify abnormalities, said method comprising the steps of:

processing the waveform signal data using multiresolution and multidirection wavelets with quadratic splines;

recursive processing the wavelet processed waveform signal data to determine prominent features, said recursive processing based on sequential recursive auto-associative memory to parse wavelet coefficients and hierarchy data; and analyzing said recursively processed waveform signal data using feed forward neural networks to identify abnonnalities in the waveform signal data.

38. A method in accordance with claim 37 wherein said wavelet processing is performed to transform full data sets.

39. A method in accordance with claim 37 wherein said waveform signal data comprises radio signal data.

40. A method for processing image data to identify abnormalities, said method comprising the steps of:

processing the image data using multiresolution and multidirection wavelets using quadratic splines, said wavelets being a first-order derivative of a smoothing function and enhance edges of image objects;

recursive processing the wavelet processed image data to determine prominent features, said recursive processing based on sequential recursive auto-associative memory to parse wavelet coefficients and hierarchy data; and analyzing said recursively processed image data using feed forward neural networks to identify abnormalities.

41. A method in accordance with claim 40 wherein said wavelet processing is performed to transform full data sets.

42. A method in accordance with claim 40 wherein context unit sets are generated in said recursive processing and wherein wavelet coefficient tuples are collected as N-dimensional vectors.

43. A method in accordance with claim 42 wherein said N-dimensional vectors are subjected to cluster processing which yields M>1 discrete states.

44. A method in accordance with claim 43 wherein a M-element feature vector is generated from said cluster processing, each vector element representing a number of times a corresponding state is found in each data set.

45. A method in accordance with claim 44 wherein the vector is weighted in accordance with the context unit vectors proximity to the centroid of the clusters.

46. A method in accordance with claim 45 wherein said feed forward neural network processing is performed to classify said feature vectors.

47. A method for processing waveform signal data in one or more dimensions to identify abnormalities in the waveform signal data, said method comprising:

processing the waveform signal data with multiresolution and multidirection wavelets using quadratic splines;

recursive processing the wavelet processed signal data to determine prominent features, said recursive processing based on sequential recursive auto-associative memory to parse wavelet coefficients and hierarchy data, context unit sets being generated in said recursive processing and wherein wavelet coefficient tuples are collected as N-dimensional vectors; and analyzing said recursively processed waveform signal data using feed forward neural networks to identify abnormalities.

48. A method in accordance with claim 47 wherein said wavelet processing is performed to transform full data sets.

49. A method in accordance with claim 47 wherein the data is image data, and said wavelets are a first-order derivative of a smoothing function and enhance edges of image objects.

50. A method in accordance with claim 47 wherein said N-dimensional vectors are subjected to cluster processing which yields M>1 discrete states.

51. A method in accordance with claim 50 wherein a M-element feature vector is generated from said cluster processing, each vector element representing a number of times a corresponding state is found in each data set.

52. A method in accordance with claim 51 wherein the vector is weighted in accordance with the context unit vectors proximity to the centroid of the clusters.

53. A method in accordance with claim 52 wherein said feed forward neural network processing is performed to classify said feature vectors.

54. A method in accordance with claim 47 wherein said waveform signal data comprises radio signal data.

* * * * *